Patented Oct. 10, 1939

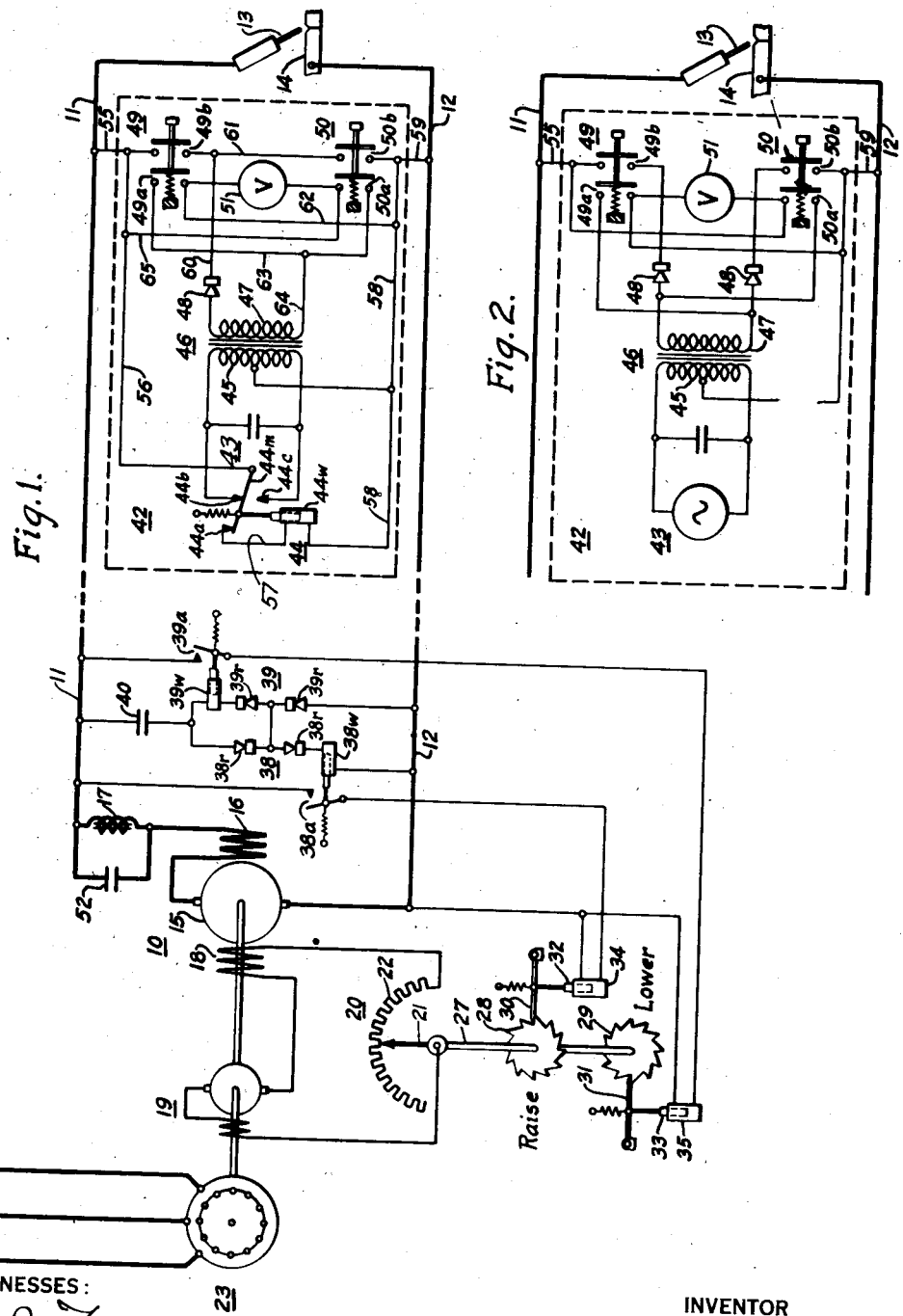

2,175,882

UNITED STATES PATENT OFFICE 2,175,882

CONTROL SYSTEM FOR ELECTRIC GENERATORS

Gennero De Croce, Wilkinsburg, Pa., assignor to Westinghouse Electric & Manufacturing Company, East Pittsburgh, Pa., a corporation of Pennsylvania Application October 18, 1934, Serial No. 748,833

11 Claims. (Cl. 171—229)

My invention relates, generally, to electrical control systems, and it has particular relation to remote control systems for electric generators.

The object of my invention, generally stated, is to provide a remote control system for electric generators which shall be simple and efficient in operation and which may be readily and economically manufactured and installed.

The principal object of my invention is to provide for controlling the output capacity of an electric generator from a remote point.

A further object of my invention is to provide for applying positive and negative control impulses to the load circuit of a generator for selectively controlling its output capacity.

Another object of my invention is to provide for applying positive and negative impulses having a fixed frequency to the load circuit of a generator for selectively controlling its output capacity, and for preventing the passage of the control impulses through the generator.

Still another object of my invention is to provide for applying different portions of a control frequency to the load circuit of a generator for selectively effecting changes in its output capacity.

Other objects of my invention will, in part be obvious, and in part, appear hereinafter.

My invention, accordingly, is disclosed in the embodiment hereof shown in the accompanying drawing, and comprises the features of construction, combination of elements and arrangement of parts, which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which:

Figure 1 illustrates diagrammatically a concrete embodiment of my invention; and Fig. 2 illustrates diagrammatically a modification of a portion of the system illustrated in Fig. 1.

In order to control the output capacity of an electric generator, such as a welding generator, means are provided for selectively controlling its field flux, in order to effect corresponding changes in the output capacity. Such means may comprise a rheostat connected to control the flow of current through a main field winding, or a plate of magnetic material, which is arranged to alter the effective field flux. The rheostat or the movable plate may be operated by means of a motor mechanism, or by means of a pawl and ratchet mechanism. Since the particular type of control for the generator forms no part of this invention, a conventional type of control has been illustrated in the diagram.

The control mechanism is selectively operated to change the output capacity of the generator in opposite directions by means of a pair of polarized relays, which are inversely connected to the load circuit of the generator. In order to selectively operate the polarized relays, the output of an alternating-current generator source is rectified and either positive or negative half cycles are applied to the load circuit. On the application of either positive or negative half cycles to the load circuit, the polarized relays may be selectively operated to effect the desired functioning of the operating mechanism for making the desired changes in the output capacity of the generator.

Since the control impulses are in the form of half waves of alternating current, they readily pass through a capacitor which does not permit the passage of direct current. The polarized relays may, therefore, be connected through one or more capacitors to the load circuit, and they will be operated only on the application of positive or negative impulses, but they will not be operated on the application of direct current to the load circuit.

It is desirable to increase the effective impedance of the generator at the control frequency, in order that a maximum control voltage may be applied to the windings of the polarized relays. For this purpose, a circuit, which may be tuned to be parallel resonant at the control frequency, is connected in series circuit relation with the generator. While the tuned circuit will readily permit the flow of welding current, it offers substantially an open circuit effect to the control frequency and, therefore, it is only necessary to provide a relatively small source of alternating-current for effecting the desired control.

Referring now particularly to Fig. 1 of the drawing, the reference character 10 designates, generally, a welding generator, which may be of any suitable type, and which is arranged to supply current to a load circuit which may be represented by conductors 11 and 12. In this instance, the generator 10 is arranged to supply current to a welding arc and, as is customary, the conductors 11 and 12 are connected, respectively, to a welding electrode 13 and work 14 on which a welding operation is to be performed.

As illustrated, the welding generator 10 is of the direct-current type, having an armature 15 and a differential series field winding 16. The armature 15 and field winding 16 are connected in series circuit relation through an inductor 17 to the conductors 11 and 12. The inductor 17 not only reduces the transient effects in the circuit due to rapid current changes, but it also may be employed to serve a secondary purpose, which will be set forth in detail hereinafter.

The generator 10 is also provided with a main field winding 18, which may be excited by means of an exciter generator 19. The amount of current which is supplied by the exciter 19 to the main field winding 18 may be controlled by means of a rheostat 20, which is provided with the customary movable arm 21 engaging a resistor 22, as illustrated.

Any suitable driving means may be provided for the generator 10 and exciter 19. As illustrated, an induction motor, shown generally at 23, is provided for driving both the generator 10 and the exciter 19, which may be mounted on a common shaft.

With a view to remotely controlling the functioning of the field rheostat 20 in order to effect corresponding changes in the output capacity of the generator 10, a mechanism is provided for selectively effecting the movement of the arm 21. As illustrated, the arm 21 is mounted on a shaft 27 on which ratchet wheels 28 and 29 are also mounted. It will be observed that the teeth of the ratchet wheels 28 and 29 are oppositely disposed, so that when the pawls 30 and 31 respectively are operated, they will be moved in opposite directions.

The pawls 30 and 31 have attached thereto respectively armatures 32 and 33, which are disposed in operative relation to solenoids 34 and 35. When the solenoid 34 is energized, the pawl 30 is moved downwardly, and the arm 21 is moved in a clockwise direction to reduce the resistance connected in series circuit relation with the field winding 18. The field current correspondingly increases and the output capacity of the generator 10 is raised. In like manner, when the pawl 31 is moved downwardly on energization of the solenoid 35, the arm 21 is moved in a counterclockwise direction and the resistance in series circuit relation with the main field winding 18 is increased. The field current flowing therethrough is correspondingly decreased, and in accordance therewith, the output capacity of the generator 10 is decreased.

The solenoids 34 and 35 may be selectively energized by means of polarized relays, shown generally at 38 and 39. Each of the polarized relays comprises contact members 38a and 39a, which, as illustrated, are arranged to connect the solenoids 34 and 35 across the conductors 11 and 12. It will be understood that any other suitable source for energizing the solenoids 34 and 35 may be provided, but for convenience, the conductors 11 and 12 are employed. The polarized relays 38 and 39 also comprise operating windings 38w and 39w and rectifiers 38r and 39r. The rectifiers 38r and 39r may be of the copper-oxide type and, as illustrated, they are oppositely connected, so that the energizing winding 38w will be energized on the application of one polarity, while the operating winding 39w will be energized on the application of another polarity.

It will be observed that two rectifiers 38r and two rectifiers 39r are provided and that the common connections between each set are connected. This arrangement is provided in order to afford a discharge path around each of the operating windings 38w and 39w which does not include the other operating winding.

In order to render the operating windings 38w and 39w non-responsive when direct current is applied to the load circuit represented by the conductors 11 and 12, a capacitor 40 is connected in series circuit relation between the operating windings 38w and 39w, and the load circuit. While a single capacitor 40 is illustrated, it will be readily understood that a capacitor individual to each of the operating windings 38w and 39w may be provided.

The control of the polarized relays 38 and 39 may be selectively effected by applying to the load circuit either positive or negative impulses at a fixed frequency. As illustrated, a readily portable controller shown generally at 42, may be provided at any point. The apparatus included in the controller 42 is indicated by the broken lines and two conductors leading thereto are illustrated. One of these conductors, it will be readily understood, may be connected to ground or work 14, while the other may be connected to the conductor 11 or electrode 13.

The controller 42 comprises an alternating-current generator, shown generally at 43. Since ordinarily, only direct current will be readily available, it is desirable to use a very simple type of alternating-current generator. This is represented by the relay 44, which comprises an operating winding 44w, back contact members 44a, and 44b, and front contact members 44c, all of which are arranged to be engaged by a movable contact member 44m that is attracted on energization of the operating winding 44w.

The contact members 44b and 44c are connected, as illustrated, to the terminals of a primary winding 45 of a transformer, shown generally at 46. The primary winding 45 is tapped at its mid-point and is connected to conductor 12 of the load circuit. As illustrated, the movable contact member 44m is connected to the other conductor 11 of the load circuit.

On energization of the operating winding 44w, the lower half of the primary winding 45 is energized, and current flows therethrough. At contact members 44a, the energizing circuit for the operating winding 44w is opened, and it is immediately deenergized. The upper half of the primary winding 45 is then energized through contact member 44b. It will then be understood that the foregoing cycle of operations is repeated rapidly at a rate, depending upon the adjustment of the relay 44. As a result, an alternating current is induced into the secondary winding 47 of the transformer 46, which may be rectified by means of a rectifier 48, similar to the rectifiers 38r and 39r, and applied to the load circuit.

It will be understood that any other suitable type of alternating-current generator may be provided, but as set forth above, a generator of the relay type appears to be best suited for this application.

The rectified output of the transformer 46 may be applied to the load circuit by means of control switches 49 and 50. When the control switch 49 is operated, the load circuit has applied thereto half waves of one polarity, while when the switch 50 is operated, the load circuit has applied thereto half waves of another polarity. It will then be understood that either the polarized relay 38 or the polarized relay 39 will be operated, depending upon whether the switch 49 or the switch 50 is operated.

In order to indicate to the operator the voltage which exists between the conductors 11 and 12, a volt-meter 51 may be provided. The volt-meter 51, while forming no part of the control apparatus, may be provided, in order to give the operator an indication of the voltage which exists on the load circuit, for the purpose of giving him a standard of comparison.

It will be observed that the armature 15 and series field winding 16 of the generator 10 provide a comparatively low impedance path between the conductors 11 and 12 of the load circuit. In effect, they provide such a low impedance path around the polarized relays 38 and 39 that it is difficult to provide sufficient control current for effecting the desired operation. It is, therefore, desirable to prevent the passage of control current through the armature 15 and field winding 16. For this purpose, the inductor 17 is provided with a capacitor 52 connected in shunt circuit relation therewith. The inductor 17 and capacitor 52 are preferably tuned to be parallel resonant at the frequency which is supplied by the generator 43. A relatively high impedance path will then be provided between the armature 15 and field winding 16 of the generator 10 and the load circuit. As a result, substantially all of the control frequency will be available for effecting the operation of the polarized relays 38 and 39.

While the inductor 17, which is normally used for reducing transients in the load circuit, has been illustrated as also being used in conjunction with the capacitor 52, it will be readily understood that a separate inductor may be used if the inductance of the inductor 17 is not satisfactory for the purpose set forth.

In describing the operation of the foregoing remote control system, it will be assumed that the generator 10 and exciter 19 are being driven by the motor 23, and that operating voltage is applied to the load circuit represented by the conductors 11 and 12. It will also be assumed that the generator 43 is operating and that the electrode 13 is out of engagement with the work 14.

The circuit for energizing the operating winding 44w of the generator 43 may be traced from energizing conductor 11, through conductors 55 and 56, movable contact member 44m, back contact member 44a, conductor 57, operating winding 44w, and conductors 58 and 59 to the energized conductor 12.

As soon, however, as the movable contact member 44m moves out of engagement with the back contact member 44a, the energizing circuit for the operating winding 44w is opened and it is deenergized.

The generator 43 is so arranged that the movable contact member 44m engages the front contact member 44c, so that the lower half of the primary winding 45 is energized. On the return of the movable contact member 44m, the lower half of the primary winding 45 is deenergized, and at contact member 44m, a circuit is completed for energizing the upper half of the primary winding 45.

It will be assumed that it is desired to effect the operation of the polarized relay 38 and to energize its operating winding 38w. The control switch 49 is then depressed to complete the energizing circuit. As long as the control switch 49 is held in the operated position, the operating winding 38w of the polarized relay 38 will be energized.

The circuit for energizing the operating winding 38w may be traced from the positive terminal of the rectifier 48 through conductors 60 and 61, contact members 49b, conductors 55 and 11, capacitor 40, rectifiers 38r, operating winding 38w, conductors 12, 59, 58 and 62, contact members 49a, conductors 63 and 64, and secondary winding 47 to the negative terminal of the rectifier 48.

If it is desired to operate the polarized relay 39, the control switch 50 may be depressed. A circuit is then completed for applying half waves to the load circuit, which are opposite in polarity to those which are applied when the control switch 49 is depressed.

The circuit for energizing the operating winding 39w may be traced from the positive terminal of the rectifier 48 through conductors 60 and 61, contact members 50b, conductors 59 and 12, rectifiers 39r, operating winding 39w, capacitor 40, conductors 11, 55 and 65, contact members 50a, conductors 63 and 64 and secondary winding 47 to the negative terminal of the rectifier 48.

At contact members 38a and 39a, obvious energizing circuits for the solenoids 34 and 35 are completed. The energization of either of the operating windings 38w or 39w serves to move the rheostat 20 in either direction for one step. It is necessary to effect the successive operation of either of the polarized relays 38 or 39 in order to move the rheostat 20 in successive steps.

It will be readily understood by those skilled in the art that the polarized relays 38 and 39 may be employed to control the operation of a reversible motor mechanism which may be connected to move the arm 21 in opposite directions. In the event that such a mechanism is used, the arm 21 would continue to move in one or the other direction, as long as either of the polarized relays 38 or 39 remained operated.

In the modification of the controller 42 illustrated in Fig. 2 of the drawing, it will be observed that two rectifiers 48 are provided. With this arrangement, both the positive and negative half cycles of the alternating-current frequency generated by the generator 43 are utilized. From the standpoint of the operation of the transformer 46, it may be desirable to use two rectifiers 48, rather than a single one connected, as illustrated in Fig. 1. However, insofar as the functioning of the system is concerned, there will be no difference and, therefore, the circuits illustrated in Fig. 2 of the drawing will not be described in detail.

Since certain further modifications of the invention may be made without departing from the scope thereof, it is intended that all matter contained in the above description, or shown in the accompanying drawing, shall be interpreted as illustrative and not in a limiting sense.

I claim as my invention:

1. A remote control system for an electric generator connected to supply direct current to a load circuit, comprising, in combination, control means operable to either increase or decrease the output of the generator, a source of control frequency, polarized relay means connected across the load circuit disposed to be selectively responsive to the application to said load circuit of positive or negative impulses of said control frequency for selectively operating said control means, capacitor means interposed between said polarized relay means and the load circuit for preventing the operation of said polarized relay means on application of direct current to the load circuit, and means for connecting the source of control frequency to the load circuit for selectively applying to the load circuit said positive and negative impulses for effecting the functioning of said control means.

2. A remote control system for an electric generator comprising, in combination, a load circuit for the generator, raise means disposed to increase the output of the generator, lower means disposed to decrease the output of the generator, a polarized relay individual to each of said means and inversely connected for energization across said load circuit, capacitor means interposed in series circuit relation with the operating windings of said relays for preventing the energization thereof on application of direct current to said load circuit, an alternating-current generator, rectifying means for obtaining half waves from said alternating-current generator, and switch means for connecting said generator to the load circuit through said rectifying means for selectively applying either positive or negative half waves to said load circuit from said alternating-current generator for effecting the operation of either of said polarized relays.

3. A remote control system for an electric generator connected to supply direct current to a load circuit comprising, in combination, a load circuit for the generator, control means operable to either increase or decrease the output of the generator, a source of control frequency, means for applying the control frequency to the load circuit, means connected across the load circuit responsive to the application of said control frequency to the load circuit for effecting the functioning of said control means, and a filter circuit tuned to parallel resonance at said control frequency and connected in the load circuit in series circuit relation with the generator between said generator and the frequency responsive means for increasing the impedance of the generator to said control frequency.

4. A remote control system for an electric generator connected to supply direct current to a load circuit comprising, in combination, control means operable to either increase or decrease the output of the generator, a source of control frequency, means for applying different portions of the control frequency to the load circuit, means connected across the load circuit and responsive to the application of different portions of said control frequency to the load circuit for selectively operating said control means, and a filter circuit tuned to parallel resonance at said control frequency and connected in the load circuit between the generator and the frequency responsive means for increasing the impedance of the generator to said control frequency.

5. A remote control system for an electric generator connected to supply direct current to a load circuit comprising, in combination, control means operable to either increase or decrease the output of the generator, means for generating a control frequency, means for selectively applying either positive or negative half cycles of said control frequency to the load circuit, means connected to the load circuit responsive to the application of the positive or negative half cycles of said control frequency for selectively effecting the functioning of said control means, and a filter circuit tuned to parallel resonance at said control frequency and connected in the load circuit between the generator and the frequency responsive means for increasing the impedance of the generator to said control frequency.

6. A remote control system for an electric generator connected to supply direct current to a load circuit comprising, in combination, control means operable to either increase or decrease the output of the generator, means for generating a control frequency, polarized relay means connected to the load circuit disposed to be responsive to the application to said load circuit of positive or negative impulses of said control frequency for selectively operating said control means, means for selectively applying to the load circuit said impulses for effecting the functioning of said control means, and a filter circuit tuned to parallel resonance at said frequency and connected in the load circuit between the generator and the polarized relay means for increasing the impedance of the generator to said control frequency.

7. A remote control system for an electric generator connected to supply direct current to a load circuit comprising, in combination, raise means disposed to increase the output of the generator, lower means disposed to decrease the output of the generator, a polarized relay individual to each of said means and inversely connected for energization across said load circuit, capacitor means interposed in series circuit relation with the operating windings of said relays for preventing the energization thereof on application of direct current to the load circuit, an alternating current source disposed to generate a control frequency, rectifying means for obtaining half waves from said alternating-current source, switch means operable in conjunction with the rectifying means for selectively applying either positive or negative half waves to the load circuit from said alternating-current source for effecting the functioning of either of said polarized relays, and a filter circuit tuned to parallel resonance at said control frequency and connected in the load circuit between the generator and the polarized relays for increasing the impedance of the generator to said control frequency.

8. A remote control system for an electric generator comprising, in combination, a load circuit for the generator, raise means disposed to increase the output of the generator, lower means disposed to decrease the output of the generator, a relay individual to each of said means and disposed to control the operation thereof, an operating winding for each of said relays, a rectifier connected in series circuit relation with each of said windings across said load circuit, said rectifiers being oppositely connected to permit the energization of one of said windings on application of one polarity and the energization of the other of said windings on application of another polarity, capacitor means interposed in series circuit relation with said operating windings to prevent the energization thereof on application of direct current to said load circuit, an alternating-current generator, rectifying means for obtaining half waves from said generator, and switch means operable in conjunction with the rectifiers for selectively applying either positive or negative half waves to said load circuit from said alternating-current generator for effecting the energization of either of said operating windings.

9. A remote control system comprising, in combination, a direct-current generator, a load circuit for the generator, field varying means for the generator, motor means operatively connected to said field varying means, a control frequency generator, circuit means including control switch means for connecting the control frequency generator to the load circuit to selectively apply thereto a control frequency of positive or negative impulses, and frequency responsive means connected to said load circuit and selectively responsive to said positive and negative impulses disposed to initiate the operation of said motor means on application of control frequency to said load circuit to change the output of said generator.

10. A remote control system comprising, in combination, a direct-current generator, a load circuit for said generator, a main field winding in said generator, a rheostat connected to vary the flow of exciting current through said main field winding, motor means having driving connection with said rheostat for operating it, a source of control frequency circuit means including rectifier means for connecting the source of control frequency to said load circuit to selectively apply thereto a control frequency of positive or negative half waves, and frequency responsive means connected to said load circuit and selectively responsive to the control frequency disposed to initiate the functioning of said motor means on application of control frequency to said load circuit to change the output of said generator.

11. A remote control system for a direct current generator, comprising, a load circuit for the generator, control means operable to either increase or decrease the output of the generator, a source of control frequency, rectifier means, manually operable means for connecting the source of control frequency to the load circuit through said rectifier means to selectively apply thereto a frequency of either positive or negative polarity, and relay means connected across the load circuit selectively responsive to the positive and negative frequencies applied thereto for selectively operating said control means.

GENNERO DE CROCE.